(12) United States Patent
Kim

(10) Patent No.: US 6,810,007 B1
(45) Date of Patent: Oct. 26, 2004

(54) OFDM TRANSMISSION/RECEIVING SYSTEM AND BLOCK ENCODING METHOD THEREFOR

(75) Inventor: Jin-sook Kim, Yongin (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 09/534,630

(22) Filed: Mar. 27, 2000

(30) Foreign Application Priority Data

Mar. 26, 1999 (KR) .......................................... 99-10494

(51) Int. Cl.⁷ ................................................ H04J 11/00
(52) U.S. Cl. ...................................... 370/208; 375/261
(58) Field of Search ................................ 370/203, 208, 370/204, 206, 480, 485; 375/261, 265, 298, 279, 281, 308, 148, 354, 286, 144, 346, 348

(56) References Cited

U.S. PATENT DOCUMENTS

| | | | | |
|---|---|---|---|---|
| 5,311,553 A | * | 5/1994 | Chennakeshu et al. | 375/265 |
| 5,425,050 A | * | 6/1995 | Schreiber et al. | 375/141 |
| 5,504,775 A | * | 4/1996 | Chouly et al. | 370/210 |
| 5,784,409 A | * | 7/1998 | Coles | 375/286 |
| 5,914,933 A | * | 6/1999 | Cimini et al. | 370/208 |
| 6,151,296 A | * | 11/2000 | Vijayan et al. | 370/208 |
| 6,175,551 B1 | * | 1/2001 | Awater et al. | 370/210 |
| 6,188,717 B1 | * | 2/2001 | Kaiser et al. | 375/148 |
| 6,301,221 B1 | * | 10/2001 | Paterson | 370/208 |
| 6,301,268 B1 | * | 10/2001 | Laroia et al. | 370/481 |
| 6,373,859 B1 | * | 4/2002 | Jedwab et al. | 370/497 |
| 6,445,747 B1 | * | 9/2002 | Jafarkhani et al. | 370/206 |
| 6,487,258 B1 | * | 11/2002 | Jedwab et al. | 375/340 |
| 6,501,810 B1 | * | 12/2002 | Karim et al. | 375/354 |
| 6,631,175 B2 | * | 10/2003 | Harikumar et al. | 375/260 |

* cited by examiner

Primary Examiner—Steven Nguyen
(74) Attorney, Agent, or Firm—Burns, Doane, Swecker & Mathis, L.L.P.

(57) ABSTRACT

An orthogonal frequency division multiplexing (OFDM) transmission/receiving system, and a block encoding method therefor, are provided. The OFDM transmission system includes a block encoder for encoding binary data of U length into V-ary data expressed in a group of n bits according to a predetermined mapping rule, a serial-to-parallel converter for converting the V-ary data into parallel data, a V-ary modulator for V-ary modulating V-ary data received in parallel to generate an orthogonal frequency division multiplexing (OFDM) symbol having U sub-symbols, and a transmitter for post-processing the OFDM symbol so that the OFDM symbol is suitable for telecommunications and transmitting the resultant OFDM symbol. In this method, Q-ary data is block encoded and Q-ary modulated to reduce the ratio of the peak power to the average power of an OFDM signal when it is transmitted, so that the OFDM signal can be transmitted at a high data transmission rate as compared to the prior art in which binary data is block encoded.

7 Claims, 5 Drawing Sheets

| HEX MS\LS | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 0346 | 0361 | 0389 | 0392 | 049C | 059D | 0652 | 0753 | 086C | 09A1 | 0A6E | 0BA3 | 0C4A | 0C5D | 0C85 | 0CAE |
| 1 | 1257 | 1270 | 1283 | 1298 | 148C | 158D | 1642 | 1743 | 18B0 | 197D | 1AB2 | 1B7F | 1D4C | 1D5B | 1D94 | 1DBF |
| 2 | 2143 | 2164 | 21B0 | 21AB | 2470 | 2571 | 26BE | 27BF | 284C | 2981 | 2A4E | 2B83 | 2E7F | 2E68 | 2E8C | 2EA7 |
| 3 | 3052 | 3075 | 30BA | 30A1 | 3460 | 3561 | 36AE | 37AE | 3890 | 395D | 3A92 | 3B5F | 3F79 | 3F6E | 3F9D | 3FB6 |
| 4 | 40D8 | 41D9 | 4216 | 4317 | 4702 | 4725 | 47CD | 47D6 | 480E | 4819 | 48C1 | 48EA | 4C28 | 4DE5 | 4E2A | 4FE7 |
| 5 | 50C8 | 51C9 | 5206 | 5307 | 5613 | 5634 | 56C7 | 56DC | 5908 | 591F | 59D0 | 59FB | 5CF4 | 5D39 | 5EF6 | 5F3B |
| 6 | 6034 | 6135 | 62FA | 63FB | 6507 | 6520 | 65F4 | 65EF | 6A3B | 6A2C | 6AC8 | 6AE3 | 6C08 | 6DC5 | 6E0A | 6FC7 |
| 7 | 7024 | 7125 | 72EA | 73EB | 7416 | 7431 | 74EF | 74E5 | 7B3D | 7B2A | 7BD9 | 7BF2 | 7CD4 | 7D19 | 7ED6 | 7F1B |
| 8 | 80EA | 8129 | 82E6 | 832B | 840D | 8426 | 84C2 | 84D5 | 8B01 | 8B1A | 8BCE | 8BE9 | 8C14 | 8D15 | 8EDA | 8FDB |
| 9 | 9038 | 91F5 | 923A | 93F7 | 951C | 9537 | 95C4 | 95D3 | 9A0B | 9A10 | 9ADF | 9AF8 | 9C04 | 9D05 | 9ECA | 9FCB |
| A | A0C4 | A109 | A2C6 | A30B | A604 | A62F | A6F7 | A6E0 | A938 | A923 | A9CB | A9EC | ACF8 | ADF9 | AE36 | AF37 |
| B | B018 | B1D5 | B21A | B3D7 | B715 | B73E | B7F1 | B7E6 | B832 | B829 | B8DA | B8FD | BCE8 | BDE9 | BE26 | BF27 |
| C | C049 | C062 | C086 | C091 | C4A0 | C56D | C6A2 | C76F | C850 | C951 | CA9E | CB9F | CF45 | CF5E | CF8A | CFAD |
| D | D158 | D173 | D180 | D197 | D47C | D5B1 | D67E | D7B3 | D840 | D941 | DA8E | DB8F | DE4F | DE54 | DE9B | DEBC |
| E | E240 | E26B | E2B3 | E2A4 | E480 | E54D | E682 | E74F | E8BC | E9BD | EA72 | EB73 | ED7C | ED67 | ED8F | EDA8 |
| F | F351 | F37A | F3B5 | F3A2 | F45C | F591 | F65E | F793 | F8AC | F9AD | FA62 | FB63 | FC76 | FC6D | FC9E | FCB9 |

FIG. 4

| HEX MS\LS | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | J | J | J | | | G | G | G | H | H | H | | N | N | N | |
| 1 | K | K | K | | | | | | | | | | P | P | | |
| 2 | G | G | G | G | G | J | J | J | H | H | H | H | H | H | H | H |
| 3 | | | | | | K | K | K | | | | | | | | |
| 4 | | | | | | | | | | | | | | | | |
| 5 | H | H | H | H | H | Q | Q | Q | L | L | L | L | L | G | G | G |
| 6 | | | | | | R | R | R | M | M | M | | | | | |
| 7 | Q | Q | Q | | | | | | G | G | G | G | G | L | L | L |
| 8 | R | R | R | | | H | H | H | | | | | | M | M | M | ial
OFDM TRANSMISSION/RECEIVING SYSTEM AND BLOCK ENCODING METHOD THEREFOR

BACKGROUND OF THE INVENTION

1. Field of the Invention

The present invention relates to an orthogonal frequency division multiplexing (OFDM) transmission/receiving system and a block encoding method therefor.

2. Description of the Related Art

OFDM, which is a multiplexed carrier modulation method, stands up very well against multi-path fading and inter-symbol interference, and provides a low signal-to-noise ratio (SNR). In OFDM, data can be reliably transmitted at a high data transmission rate even in a channel where severe temporal dispersion occurs. In particular, the OFDM technique is suitable for the radio communications field, and has been applied to wireless LAN and digital audio or video broadcasting.

However, the OFDM technique has a disadvantage in that, in certain circumstances, a very high peak-to-average power ratio (hereinafter, referred to as a PAR) is obtained upon transmission of an OFDM signal. For instance, when data is transmitted using N subcarriers, a peak power, which is N times as large as an average power, can be obtained, such as in situations were N in-phase signals are summed. The peak power, which is greater than the average power, becomes a non-linear factor and provokes intermodulation between subcarriers. This deteriorates the SNR at a receiver and causing unwanted out-of-band radiation. If a power amplifier or mixer operates with a small back-off, it is not possible to maintain out-of-band power within the limits imposed by telecommunications authorities, and the SNR at the receiver is deteriorated. Therefore, the power amplifier preferably operates with a large back-off to prevent spectral regrowth of an OFDM signal due to the intermodulation between subcarriers and unwanted out-of-band radiation. This means that the amplifier operates ineffectively. Consequently, the cost of transmitters increases.

In order to solve this problem, it is preferable to reduce the PAR by performing fast Fourier transforms (FFT) or an alternative method of changing the phase of a signal or a method of using a block code. In the method of using FFT, a solution for reducing the PAR is searched by adding a block which has a value at only an arbitrary subcarrier in front of a fast Fourier transformer (FFT) and alternating FFT and inverse FFT (IFFT). However, in this method, the same work is repeated on every transmission data to find a value for reducing the PAR. Accordingly, realization of this method is complicated, and temporal delay occurs, so that this method is not suitable for telecommunications systems.

The method of changing the phase is to appropriately convert the phases of the N signals to be transmitted in order to prevent the N signals from having the same phase. This phase changing method includes complementary codes using Golay codes and Reed-Muller codes. The complementary codes use a phase shifter which is expressed as an exponential function, in order to convert the phases of the N signals into a set of phase codes. However, the phase shifter has a problem in that it is complicated to realize in hardware.

The block code method has a disadvantage in that an encoder and a decoder are large due to a codebook. Also, only a block code for binary modulation data is considered in this method, so the data transmission rate is low.

SUMMARY OF THE INVENTION

To solve the above problems, an objective of the present invention is to provide an orthogonal frequency division multiplexing (OFDM) transmission system for encoding binary data having a predetermined length into Q-ary data which is expressed in a pair of two bits, and modulating the encoded binary data, and an OFDM receiving system for demodulating and decoding a received OFDM signal, and a block encoding method for encoding the binary data into Q-ary data.

To achieve the above objective, the present invention provides an orthogonal frequency division multiplexing (OFDM) transmission system including: a block encoder for encoding binary data of U length into V-ary data expressed in a group of n bits according to a predetermined mapping rule; a serial-to-parallel converter for converting the V-ary data into parallel data; a V-ary modulator for V-ary modulating V-ary data received in parallel to generate an orthogonal frequency division multiplexing (OFDM) symbol having U sub-symbols; and a transmitter for post-processing the OFDM symbol so that the OFDM symbol is suitable for telecommunications and transmitting the resultant OFDM symbol.

To achieve the above objective, the present invention provides an orthogonal frequency division multiplexing (OFDM) receiving system including: a preprocessor for pre-processing an OFDM symbol transmitted via U carrier waves so that the OFDM symbol is suitable for demodulation; a V-ary demodulator for V-ary demodulating the pre-processed OFDM signal to generate V-ary data expressed in a group of n bits; a parallel-to-serial converter for converting the V-ary data into serial data; and a block decoder for decoding serial V-ary data into binary data of U length according to a predetermined mapping rule.

To achieve the above objective, the present invention provides a block ending method for OFDM transmission, including: generating V-ary data expressed in a group of n bits; generating an OFDM symbol by modulating and inverse-fast-Fourier-transforming the V-ary data; determining whether the OFDM symbol satisfies a predetermined condition, and if the OFDM symbol satisfies the predetermined condition, classifying the OFDM symbol as a candidate codeword; extracting as many codewords as the number of receivable binary data from candidate codewords, in sequence of codewords having a small bit change; and forming a codebook by matching the extracted codewords to each receivable binary data.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENT

Figure 1A:
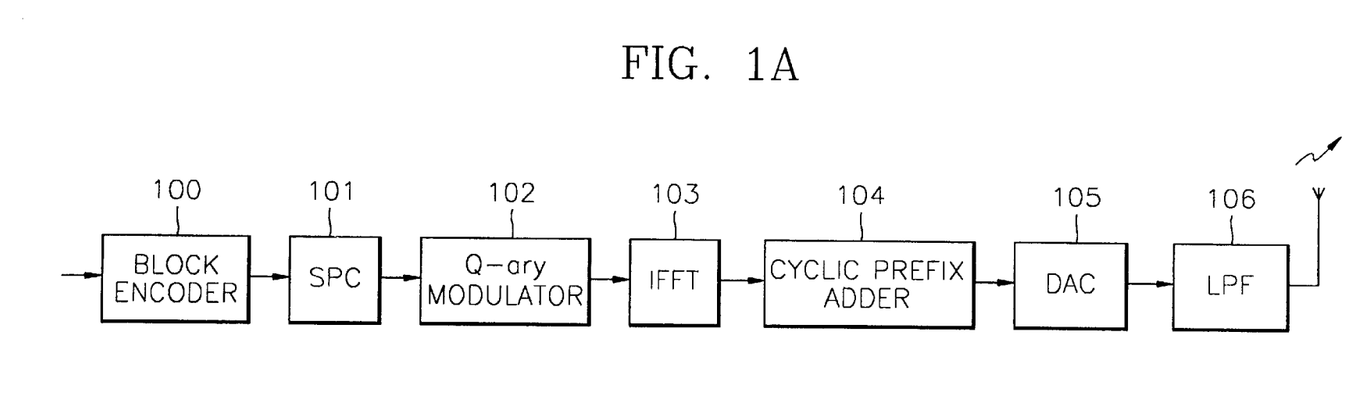
FIGS. 1A and 1B are block diagrams of an orthogonal frequency division multiplexing (OFDM) transmission system according to the present invention and an OFDM receiving system according to the present invention, respectively.

Referring to FIG. 1A, an orthogonal frequency division multiplexing (OFDM) transmission system according to the present invention includes a block encoder 100, a serial-to-parallel converter (SPC) 101, a Q-ary modulator 102, an inverse fast Fourier transformer (IFFT) 103, a cyclic prefix adder 104, a digital-to-analog converter (DAC) 105, and a low pass filter (LPF) 106.

The block encoder 100 block-encodes binary data having a predetermined length at a predetermined code rate. In the case of a transmission system having 8 subcarriers, 8-bit binary data $A_0, A_1, \ldots, A_7$ are block encoded at a code rate of ½ and converted into 16-bit binary data $C_0, C_1, \ldots, C_{15}$. This conversion follows a predetermined mapping rule. The SPC 101 converts data converted by the block encoder 100 into parallel data.

The Q-ary modulator 102 modulates 16-bit binary data $C_0, C_1, \ldots, C_{15}$ according to a Q-ary data value expressed in a pair of two bits, to form 8 sub-symbols. A quadrature amplitude modulator or a quadrature phase shift keying apparatus is appropriate for the Q-ary modulator 102. In the present invention, the Q-ary modulator is taken as an example for simple explanation, but it can be extended to a V-ary modulator according to the results of encoding by the block encoder 100.

The IFFT 103 performs 8-IFFT on data modulated by the Q-ary modulator 102 to form an OFDM symbol. The cyclic prefix adder 104 adds a cyclic prefix to the OFDM symbol. The length of the added cyclic prefix is about 10% of the length of an OFDM symbol. The DAC 105 converts the OFDM symbol to which the cyclic prefix is added into an analog signal, and LPF 106 low-pass filters the analog signal.

Figure 1B:
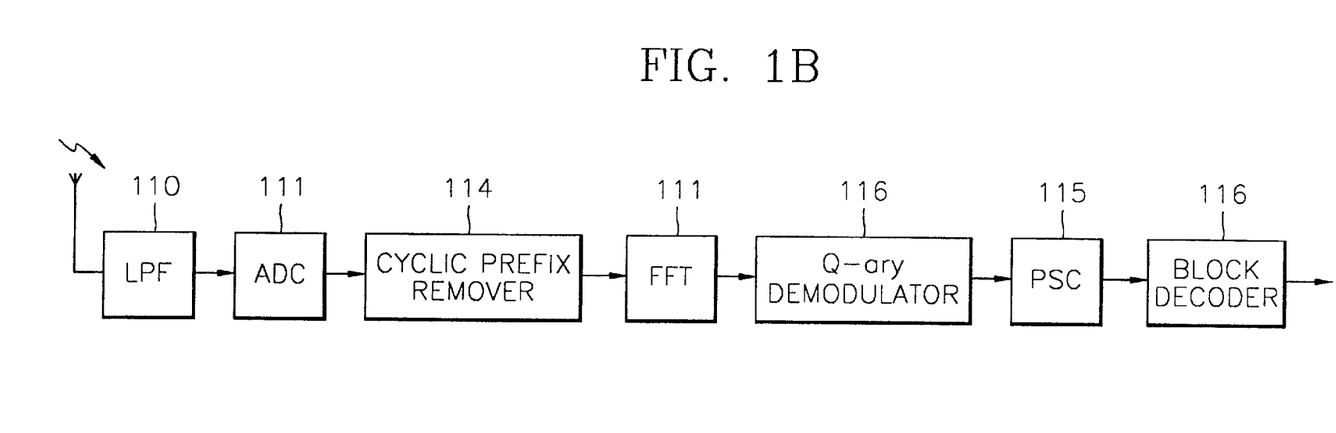

FIG. 1B is a block diagram of an OFDM receiving system for receiving a signal transferred from the transmission system of FIG. 1A. The receiving system of FIG. 1B includes an LPF 110, an analog-to-digital converter (ADC) 111, a cyclic prefix remover 112, an FFT 113, a Q-ary demodulator 114, a parallel-to-serial converter (PSC) 115, and a block decoder 116.

The LPF 110 in the receiving system filters the transmitted OFDM signal at the same frequency band as the LPF 106 of the transmission system. The ADC 111 converts a filtered signal into a digital signal, and the cyclic prefix remover 112 removes the cyclic prefix added in the transmission system. The FFT 113, the Q-ary demodulator 114, the PSC 115 and the block decoder 116 perform inverse processes of the processes performed by the counterparts of the transmission system, thereby restoring an OFDM signal.

The above description refers to a system for transmitting and receiving using 8 subcarriers. In the case that transmission is performed using 16 subcarriers, the transmission system further includes an interleaver (not shown) between a block encoder 100 and an SPC 101. If 16-bit binary data $A_0, \ldots, A_7, A_8, \ldots, A_{15}$ are sequentially received, the block encoder 100 block-encodes the 16-bit binary data $A_0, \ldots, A_7, A_8, \ldots, A_{15}$ at a code rate of ½ to output $C_0C_1 \ldots, C_{14}C_{15}$ and $C_{16}C_{17}, \ldots, C_{30}C_{31}$. The interleaver interleaves $C_0C_1 \ldots, C_{14}C_{15}C_{16}C_{17}, \ldots, C_{30}C_{31}$ into $C_0C_1C_{16}C_{17}C_2C_3C_{18}C_{19} \ldots C_{14}C_{15}C_{30}C_{31}$. At this time, the output of the Q-ary modulator 102 is an OFDM symbol having 16 sub-symbols.

In the case that transmission is performed using 16 subcarriers, the receiving system further includes a deinterleaver (not shown) between the PSC 115 and the block encoder 116. The deinterleaver deinterleaves $C_0C_1C_{16}C_{17}C_2C_3C_{18}C_{19} \ldots C_{14}C_{15}C_{30}C_{31}$ into $C_0C_1 \ldots, C_{14}C_{15}C_{16}C_{17}, \ldots, C_{30}C_{31}$.

Figure 2A:
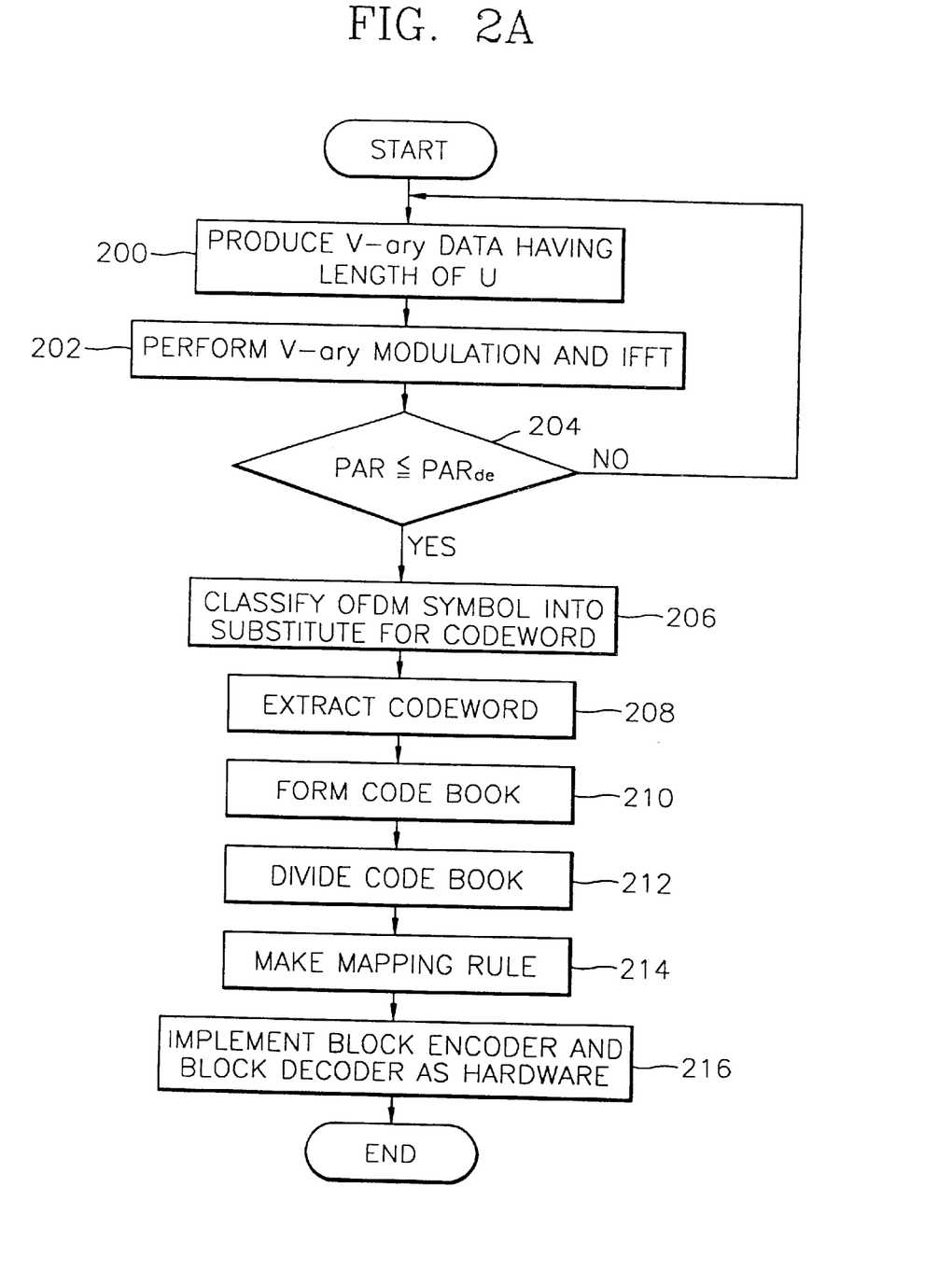
FIG. 2A is a flowchart illustrating a method of designing the block encoder and the block decoder shown in FIGS. 1A and 1B.

FIG. 2A is a flowchart illustrating a method of designing the block encoder and the block decoder shown in FIGS. 1A and 1B. The method of designing the block encoder and the block decoder shown in FIGS. 1A and 1B, includes a V-ary data production method 200, an OFDM symbol production step 202, a determination step (204 and 206), a mapping rule generating step (208 through 214), and a hardware designing step 216.

Figure 2B:
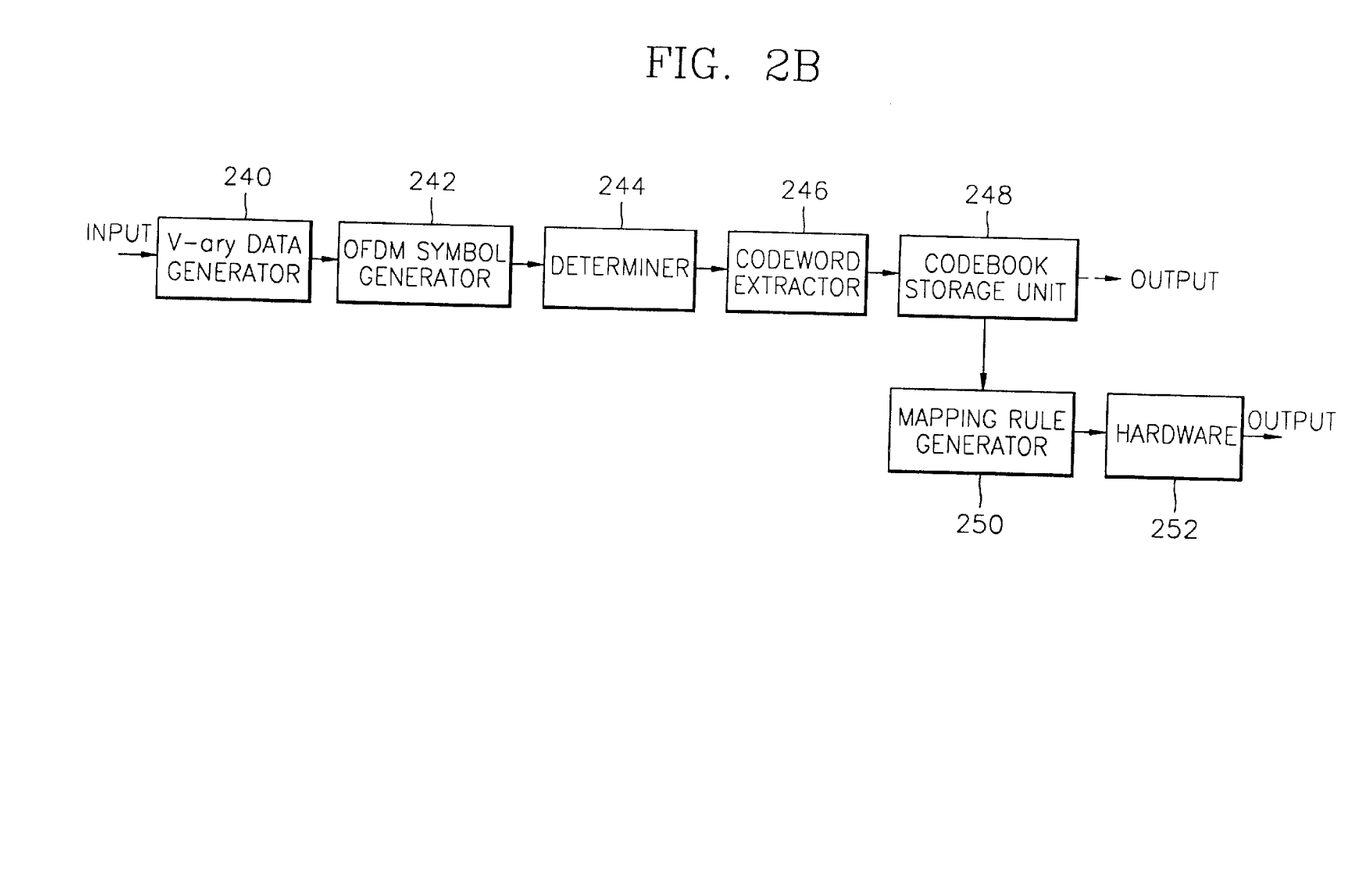
FIG. 2B is a block diagram of an apparatus for designing a block encoder.

FIG. 2B is a block diagram of an apparatus for performing the steps shown in FIG. 2A. The apparatus of FIG. 2B includes a V-ary data generator 240, an OFDM symbol generator 242, a determiner 244, a codeword extractor 246, a codebook storage unit 248, a mapping rule generator 250 and a hardware 252.

The method of designing a block encoder and a block decoder, according to the present invention, will now be described in detail referring to FIGS. 2A and 2B.

When the required number of sub-symbols, U, and a modulation method, V-ary, of data to be transmitted in units of sub-symbols, are determined, the V-ary data generator 240 generates V-ary data having a length of U, in step 200. The OFDM symbol generator 242 V-ary modulates the V-ary data and preforms IFFT on the V-ary data, thereby generating an OFDM symbol, in step 201. The determiner 244 determines whether the OFDM symbol satisfies a predetermined condition, for example, whether the PAR of the OFDM symbol is smaller than or equal to a desired value $PAR_{de}$, in step 204. If the OFDM symbol satisfies the predetermined condition, the determiner 144 classifies an OFDM symbol into a candidate codeword, in step 206.

If Q-ary data having 8 sub-symbols are modulated and transmitted, 640 data satisfying the condition of $PAR_{u=8} \leq 1.03$ dB, among a total of $4^8$ (=45536) Q-ary data, are classified as candidate codewords, for example. If Q-ary data having 16 sub-symbols is transmitted, it is preferable that the condition of determining whether Q-ary data can be classified as a candidate codeword is $PAR_{de} \cong 6$ dB, for example.

PAR can be calculated by Equation 1:

$$PAR = \frac{\max(|X(t)|)^2}{\frac{1}{T}\int_0^T (|X(t)|)^2 dt} \qquad (1)$$

wherein X(t) denotes an OFDM symbol, and T denotes the duration of an OFDM symbol.

Figure 3:
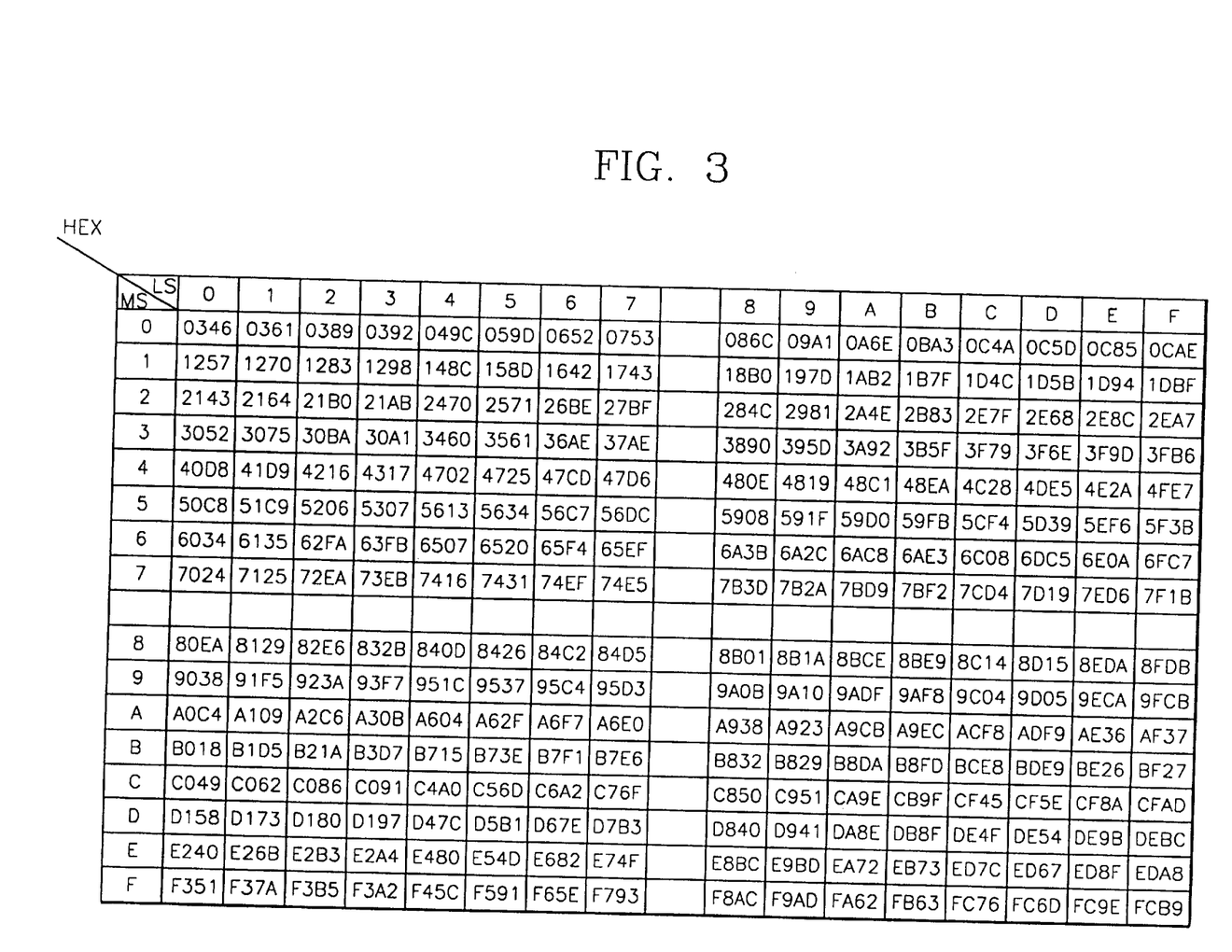
FIG. 3 illustrates an example of a codebook formed by performing the steps shown in FIG. 2A.

The codeword extractor 246 extracts as many codewords as the total number of received binary data, which can reduce the size of an encoder or a decoder. In other words, this extractor 246 can reduce the number of gates constituting the encoder or the decoder because of a small bit change between data, from classified candidate codewords, and sets the extracted codewords as final codewords, in step 208. If 8-long binary data, that is, 8-bit binary data, is received, $2^8$ (=256) codewords are extracted. The codebook storage unit 248 stores a codebook for mapping these codewords into binary data, in step 210. FIG. 3, which illustrates an example of a codebook formed by performing these steps, shows the relationship between the input and output of an encoder or a decoder. The numbers shown in the codebook are expressed in hexadecimal form, MS denotes four most significant bits $A_0A_1A_2A_3$ of an encoder, and LS denotes four least significant bits $A_4A_5A_6A_7$ of the encoder. The rest of the numbers are expressed in hexadecimal form of 16-bit output data $C_0C_1 \ldots C_{14}C_{15}$ which corresponds to each of the inputs of an encoder comprised of MS and LS.

Figure 4:
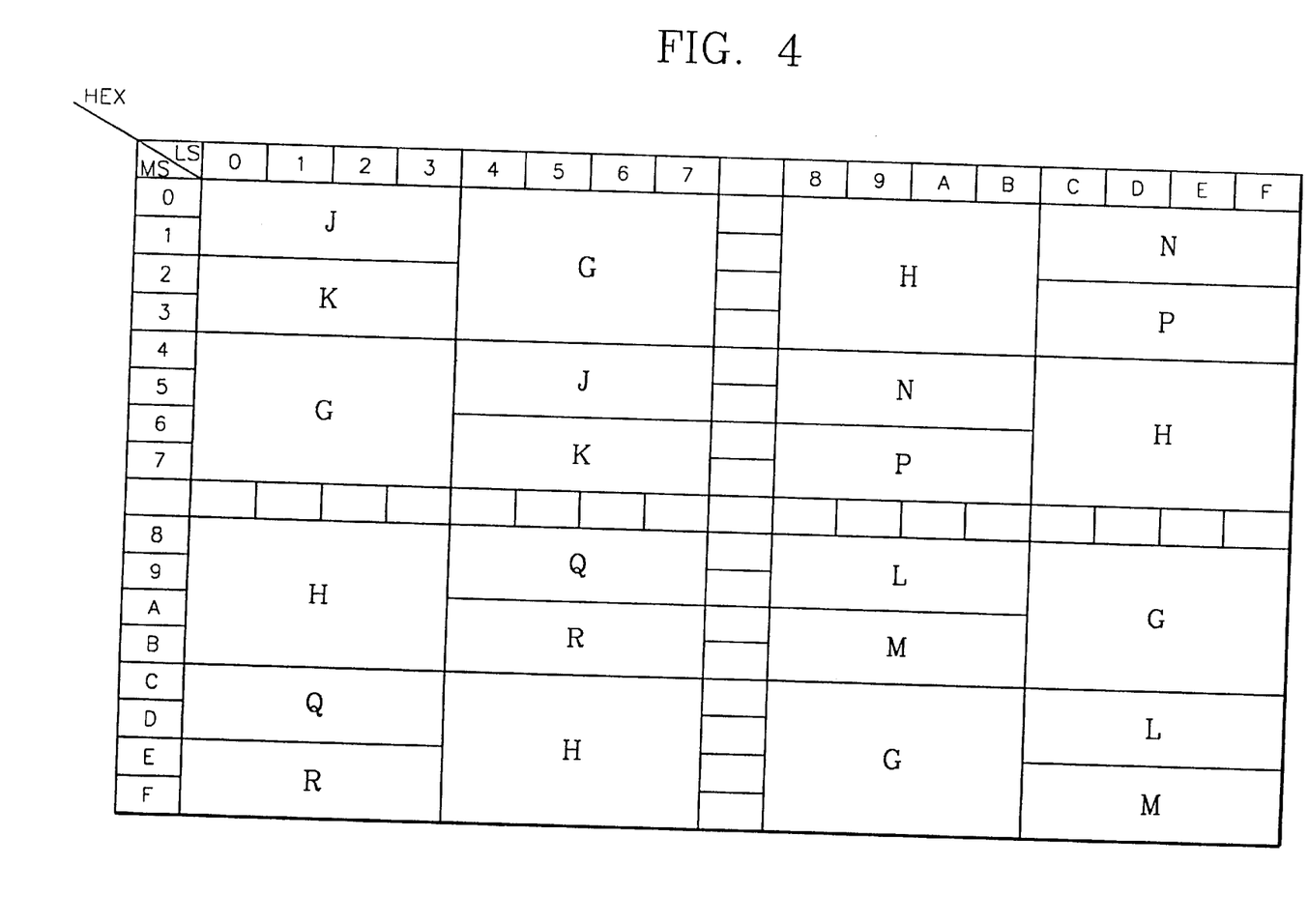
FIG. 4 illustrates an example of a segmented codebook used in the present invention.

The codebook storage unit 248 can be considered as a block encoder. That is, received binary data acts as an address, and a codeword stored at a position indicated by the address can be read and output. In order to perform this operation faster, a predetermined mapping rule is extracted from the codebook, and a block encoder can be implemented as hardware so that the extracted mapping rule is satisfied. To do this, the mapping rule generator 250 segments the codebook into predetermined areas, in step 212. FIG. 4 illustrates an example of a segmented codebook used in the present invention. As shown in FIG. 4, the codebook is segmented into areas G, H, J, K, L, M, N, P, Q and R. For example, 64 codewords satisfy the area G. The segmented area G is simplified according to the well-known Karnaugh map, thereby establishing the following boolean logic equation 2:

$$G = \overline{A_0 A_1} \overline{A_4} A_5 + \overline{A_0} A_1 \overline{A_4 A_5} + \overline{A_0} \overline{A_1} A_4 A_5 + A_0 A_1 \overline{A_4} \overline{A_5} \quad (2)$$

Similarly, the areas H, J, K, L, M, N, P, Q and R can be expressed by the following boolean logic Equation 3:

$$H = \overline{A_0 A_1} A_4 \overline{A_5} + \overline{A_0} A_1 A_4 A_5 + A_0 \overline{A_1} A_4 A_5 + A_0 A_1 \overline{A_4} A_5$$

$$K = \overline{A_0 A_1} A_2 \overline{A_4 A_5} + \overline{A_0} A_1 A_2 \overline{A_4} A_5$$

$$J = \overline{A_0 A_1 A_2 A_4 A_5} + \overline{A_0} A_1 \overline{A_2} A_4 A_5$$

$$L = A_0 \overline{A_1} A_2 A_4 \overline{A_5} + A_0 A_1 \overline{A_2} A_4 A_5$$

$$M = A_0 \overline{A_1} A_2 A_4 \overline{A_5} + A_0 A_1 A_2 A_4 A_5$$

$$N = \overline{A_0} A_1 A_2 A_4 A_5 + \overline{A_0} A_1 A_2 \overline{A_4} A_5$$

$$P = \overline{A_0} A_1 A_2 A_4 A_5 + \overline{A_0} A_1 A_2 \overline{A_4} \overline{A_5}$$

$$Q = A_0 \overline{A_1} A_2 \overline{A_4} A_5 + A_0 A_1 A_2 A_4 A_5$$

$$R = A_0 \overline{A_1} A_2 A_4 A_5 + A_0 A_1 A_2 A_4 \overline{A_5} \quad (3)$$

In step 214, a mapping rule of encoding $A_0, \ldots, A_7$ into $C_0, \ldots, C_{15}$ on the basis of Equations 2 and 3 can be expressed by the following boolean encoding logic Equation 4:

$$C_0 = A_0 G + A_0 H + A_0 J + A_0 K + A_0 L + A_0 M + A_0 N + A_0 P + A_0 Q + A_0 R \quad (4)$$

$$C_1 = A_1 G + A_1 H + A_1 J + A_1 K + A_1 L + A_1 M + A_1 N + A_1 P + A_1 Q + A_1 R$$

$$C_2 = A_2 G + A_2 H + A_2 J + A_2 K + A_2 L + A_2 M + A_2 N + A_2 P + A_2 Q + A_2 R$$

$$C_3 = A_3 G + A_3 H + A_3 J + A_3 K + A_3 L + A_3 M + A_3 N + A_3 P + A_3 Q + A_3 R$$

$$C_4 = A_4 G + A_4 H + A_4 J + A_4 K + A_4 L + A_4 M + A_4 N + A_4 P + A_4 Q + A_4 R$$

$$C_5 = A_5 G + A_5 H + A_5 J + A_5 K + A_5 L + A_5 M + A_5 N + A_5 P + A_5 Q + A_5 R$$

$$C_6 = A_6 G + A_6 H + \overline{A_4} J + A_4 K + A_0 L + \overline{A_0} M + A_0 N + A_4 P + A_4 Q + A_0 R$$

$$C_7 = A_7 G + A_7 H + \overline{A_3} J + \overline{A_3} K + \overline{A_3} L + \overline{A_3} M + A_3 N + A_3 P + A_3 Q + A_3 R$$

$$C_8 = [(\overline{A_0 \, A_2} + A_0 A_2)\overline{A_6} + (\overline{A_0} A_2 + A_0 \overline{A_2})A_6]G +$$
$$[(A_0 A_3 + \overline{A_0 \, A_3})A_7 + (A_0 + A_3)(\overline{A_0} + \overline{A_3})\overline{A_7}]H +$$
$$A_6 J + A_6 K + A_6 L + A_6 M + A_6 N + A_6 P + A_6 Q + A_6 R$$

$$C_9 = [(\overline{A_1 \, A_2} + A_1 A_2)A_6 + (\overline{A_1} + \overline{A_2})(A_1 + A_2)\overline{A_6}]G +$$
$$[(A_1 A_3 + \overline{A_1 \, A_3})\overline{A_7} + (A_1 + A_3)(\overline{A_1} + \overline{A_3})A_7]H +$$
$$(\overline{A_1 \, A_6} + A_1 A_6)J + (\overline{A_1 \, A_6} + A_1 A_6)K +$$
$$(\overline{A_1} A_6 + A_1 \overline{A_6})L + (\overline{A_1} A_6 + A_1 \overline{A_6})M +$$
$$(\overline{A_5 A_6} + A_5 \overline{A_6})N + (\overline{A_5} A_6 + A_5 \overline{A_6})P +$$
$$(A_5 A_6 + \overline{A_5 \, A_6})Q + (A_5 A_6 + \overline{A_5 \, A_6})R$$

$$C_{10} = A_2 G + \overline{A_2} H + \overline{A_6} A_7 J + (A_6 + A_7)K + A_6 A_7 L +$$
$$(\overline{A_6} + A_7)M + A_6 A_7 N + (\overline{A_6} + A)P + \overline{A_6} A_7 Q +$$
$$(A_6 + A_7)R$$

$$C_{11} = \overline{A_3} G + A_3 H + [\overline{A_3} A_6 A_7 + A_3 (\overline{A_6} + A_7)]J +$$
$$[\overline{A_3} A_6 \overline{A_7} + A_3 (\overline{A_6} + \overline{A_7})]K + [\overline{A_3 \, A_6} A_7 +$$
$$A_3 (A_6 + A_7)]L + [\overline{A_3 \, A_6 \, A_7} + A_3 (\overline{A_7} + A_6)]M +$$
$$[\overline{A_3 \, A_6} A_7 + A_3 (A_6 + A_7)]K + [\overline{A_3 \, A_6 \, A_7} +$$
$$A_3 (\overline{A_7} + A_6)]L + [\overline{A_3} A_6 A_7 + A_3 (\overline{A_6} + A_7)]Q +$$
$$[\overline{A_3} A_6 \overline{A_7} + A_3 (\overline{A_6} + \overline{A_7})]R$$

$$C_{12} = [(\overline{A_0 \, A_2} + A_0 A_2)\overline{A_6} + (\overline{A_0} A_2 + A_0 \overline{A_2})A_6]G +$$
$$[(A_0 A_3 + \overline{A_0 \, A_3})A_7 + (A_0 + A_3)(\overline{A_0} + \overline{A_3})\overline{A_7}]H +$$
$$(\overline{A_3} A_6 \overline{A_7} + A_3 A_6 A_7)J + (\overline{A_3} A_6 \overline{A_7} + A_3 A_6 \overline{A_7})K +$$
$$[(A_6 + A_7)\overline{A_3}(A_6 + \overline{A_7})A_3)]L + [(A_6 + \overline{A_7})\overline{A_3} +$$
$$(A_6 + A_7)A_3]M + (\overline{A_6} + A_7)N + (\overline{A_6} + \overline{A_7})P +$$
$$\overline{A_6 \, A_7} Q + \overline{A_6} A_7 R$$

$$C_{13} = [(A_1 A_2 + \overline{A_1 \, A_2})A_6 + (\overline{A_1} + \overline{A_2})(A_1 + A_2)\overline{A_6}]G +$$
$$[(\overline{A_1 \, A_3} + A_1 A_3)\overline{A_7} + (A_1 + A_3)(\overline{A_1} + \overline{A_3})A_7]H +$$
$$[\overline{A_1 \, A_5 \, A_6 \, A_7} + A_1 A_5 (A_6 + A_7)]J + [\overline{A_1 \, A_5 \, A_6} A_7 +$$
$$A_1 A_5 (A_6 + \overline{A_7})]K + [\overline{A_1 \, A_5} A_6 A_7 + A_1 A_5 (\overline{A_6} + A_7)]L +$$
$$[\overline{A_1 \, A_5} A_6 A_7 + A_1 A_5 (\overline{A_6} + \overline{A_7})]M + [\overline{A_3} A_5 (A_6 + A_7) +$$
$$A_3 A_5 (A_6 + \overline{A_7}) + \overline{A_1 \, A_5 \, A_6 \, A_7} + A_3 \overline{A_5} \, A_6 A_7]N +$$
$$[\overline{A_1 \, A_3}(A_6 + \overline{A_7}) + \overline{A_1} A_3 (A_6 + A_7) + A_1 \overline{A_3} \, A_6 A_7 +$$
$$A_1 A_3 \overline{A_6 \, A_7}]P + [\overline{A_3} A_5 (\overline{A_6} + A_7) + A_3 A_5 (\overline{A_6} + A_7) +$$
$$\overline{A_3 \, A_5 \, A_6 \, A_7} + A_3 \overline{A_5} A_6 A_7]Q + [\overline{A_3} A_5 (\overline{A_6} + \overline{A_7}) +$$
$$A_3 A_5 (\overline{A_6} + A_7) + \overline{A_3 \, A_5} A_6 A_7 + A_3 \overline{A_5} A_6 A_7]R$$

$$C_{14} = A_6 G + A_6 H + [(A_6 A_7 + \overline{A_6 \, A_7})\overline{A_3} + A_3 \overline{A_7}]J +$$
$$[(A_6 A_7 + \overline{A_6 \, A_7})\overline{A_3} + A_3 \overline{A_7}]K + [(A_6 + A_7) +$$
$$(\overline{A_6} + \overline{A_7})\overline{A_3} + A_3 \overline{A_7}]L +$$
$$[(A_6 + A_7)(\overline{A_6} + \overline{A_7})\overline{A_3} + A_3 \overline{A_7}]M +$$
$$[(A_6 A_7 + \overline{A_6 \, A_7})\overline{A_3} + A_3 \overline{A_7}]N + [(A_6 A_7 + \overline{A_6 \, A_7})\overline{A_3} +$$
$$A_3 \overline{A_7}]P + [(A_6 + A_7) + (\overline{A_6} + \overline{A_7})\overline{A_3} + A_3 \overline{A_7}]Q +$$
$$[(A_6 + A_7)(\overline{A_6} + \overline{A_7})\overline{A_3} + A_3 \overline{A_7}]R$$

-continued $$C_{15} = AG + AH + [(A_6 + A_7)(\overline{A_6} + \overline{A_7})A_3 + A_3\overline{A_7}]J +$$
$$[(A_6 + A_7)(\overline{A_6} + \overline{A_7})A_3 + A_3 A_7]K +$$
$$[(A_6 A_7 + \overline{A_6}\,\overline{A_7})A_3 + A_3\overline{A_7}]L +$$
$$[(A_6 + A_7)(\overline{A_6} + \overline{A_7})A_3 + A_3 A_7]M +$$
$$[(A_6 + A_7)(\overline{A_6} + \overline{A_7})A_3 + A_3 A_7]N +$$
$$[(A_6 A_7 + \overline{A_6}\,\overline{A_7})A_3 + A_3\overline{A_7}]P +$$
$$[(A_6 A_7 + \overline{A_6}\,\overline{A_7})A_3 + A_3 A_7]Q +$$
$$[(A_6 + A_7)(\overline{A_6} + \overline{A_7})A_3 + A_3\overline{A_7}]R$$

The hardware 252 as a block encoder is constituted by a plurality of OR gates, a plurality of AND gates, and a plurality of NOT gates so that the above logic equation is satisfied, and outputs a codeword corresponding to received binary data, in step 216.

Next, in order to establish the hardware 252 for a block decoder from the above equations, the values G, . . . ,R with respect to $C_0$, . . . , $C_{15}$ can be obtained as in the following boolean logic Equation 5:

$$G=(C_9+C_{13})(C_8+\overline{C_{12}})$$
$$H=(C_8+C_{12})(C_9+\overline{C_{13}})$$
$$J=\overline{C_0C_2C_4}C_6$$
$$K=\overline{C_0C_2C_4}C_6$$
$$L=C_0\overline{C_2}C_4C_6$$
$$M=C_0C_2C_4\overline{C_6}$$
$$N=\overline{C_0C_2}C_4\overline{C_6}$$
$$P=\overline{C_0}C_2C_4C_6$$
$$Q=C_0\overline{C_2C_4C_6}$$
$$R=C_0C_2\overline{C_4}C_6 \qquad (5)$$

A mapping rule of decoding $C_0$, . . . , $C_{15}$ into $A_0$, . . . , $A_7$ on the basis of Equation 5 can be expressed by the following boolean decoding logic Equation 6:

$$A_0 = C_0G + C_0H + C_0J + C_0K + C_0L + C_0M + C_0N + \qquad (6)$$
$$\quad C_0P + C_0Q + C_0R$$
$$A_1 = C_1G + C_1H + C_1J + C_1K + C_1L + C_1M + C_1N +$$
$$\quad C_1P + C_1Q + C_1R$$
$$A_2 = C_2G + C_2H + C_2J + C_2K + C_2L + C_2M + C_2N +$$
$$\quad C_2P + C_2Q + C_2R$$
$$A_3 = C_3G + C_3H + C_3J + C_3K + C_3L + C_3M + C_3N +$$
$$\quad C_3P + C_3Q + C_3R$$
$$A_4 = C_4G + C_4H + C_4J + C_4K + C_4L + C_4M + C_4N +$$
$$\quad C_4P + C_4Q + C_4R$$
$$A_5 = C_5G + C_5H + C_5J + C_5K + C_5L + C_5M + C_5N +$$
$$\quad C_5P + C_5Q + C_5R$$
$$A_6 = C_6G + C_6H + C_8J + C_8K + C_8L + C_8M + C_8N +$$
$$\quad C_8P + C_8Q + C_8R$$

-continued
$$A_7 = C_7G + C_7H + [(C_{10} + C_{11})\overline{C_3} + C_3\overline{C_{15}}]J +$$
$$[C_3C_{15} + \overline{C_3}C_{10}\overline{C_{11}}]K + [(C_{10} + C_{11})\overline{C_3} +$$
$$C_3\overline{C_{15}}]L + [C_3C_{15} + \overline{C_3}C_{10}\overline{C_{11}}]M + [(C_{10} + C_{11})\overline{C_3} +$$
$$C_3C_{15}]N + [C_3C_{14} + \overline{C_3}C_{10}\overline{C_{11}}]P + [(C_{10} + C_{11})\overline{C_3} +$$
$$[C_3C_{15}]Q + [C_3C_{14} + \overline{C_3}C_{10}\overline{C_{11}}]R$$

The block decoder is constituted of a plurality of OR gates, a plurality of AND gates, and a plurality of NOT gates according to the mapping rule for block decoding, in step 216.

In a rule of mapping between 8 data bits $A_0$, . . . , $A_7$ and 16 codeword bits $C_0$, . . . ,$C_{15}$ on the basis of the codebook shown in FIG. 3, there may be several different rules for reducing the number of logic equations required to reduce the PAR and organize an encoder and a decoder having a code rate of ½. That is, there can be a method of formulating input/output mapping logic equations which are different from those of the present invention. Also, there can be a method of optimally realizing a logic gate circuit on the basis of a logic equation that is given in the present invention.

According to the present invention, Q-ary data is block encoded and Q-ary modulated to reduce the ratio of the peak power to the average power of an OFDM signal when it is transmitted, so that the OFDM signal can be transmitted at a high data transmission rate as compared to the prior art in which binary data is block encoded.

A desired output value can be more easily found using a codebook upon encoding and decoding, and an encoder and a decoder can be constituted of only AND gates, OR gates and NOT gates by input output relational expressions according to the codebook. Therefore, hardware configuration can be simpler and smaller, and high-speed data transmission is possible by virtue of a reduction in the response delay of a system.

The present invention has been explained by way of exemplary embodiments to which it is not limited. Variations and modifications will occur to those skilled in the art which do not depart from the scope of the invention.

What is claimed is:
1. An orthogonal frequency division multiplexing (OFDM) transmission system comprising:
 a block encoder for encoding binary data of U length into V-ary data expressed in a group of n bits according to a predetermined mapping rule, wherein the block encoder is a codebook storage unit for storing V-ary data, which is expressed in a group of n bits, to be output corresponding to receivable binary data, and outputting V-ary data which is addressed by received binary data, wherein in front of the code book storage unit, the block encoder further comprises
 a V-ary data generator for generating V-ary data expressed in a group of n bits;
 an OFDM symbol generator for generating an OFDM symbol by V-ary modulating and inverse-fast-Fourier-transforming (IFFT) the V-ary data;
 a determiner for determining whether the OFDM symbol satisfies a predetermined condition, and if the OFDM symbol satisfies the predetermined condition, classifying the OFDM symbol as a candidate codeword; and
 a codeword extractor for extracting $2^U$ codewords having a small bit change from candidate codewords, wherein the extracted codewords are stored as the

V-ary data at corresponding locations in the codebook storage unit where the binary data acts as an address;

a serial-to-parallel converter for converting the V-ary data into parallel data;

a V-ary modulator for V-ary modulating V-ary data received in parallel to generate an orthogonal frequency division multiplexing (OFDM) symbol having U sub-symbols; and a transmitter for transmitting the OFDM symbol.

2. The OFDM transmission system of claim 1, wherein the determiner determines whether a ratio of the peak power to the average power of the OFDM symbol is smaller than or equal to a predetermined value.

3. The OFDM transmission system of claim 1, wherein a codebook for storing V-ary data to be output corresponding to receivable binary data is segmented into predetermined areas, and the segment areas are expressed in a first logic equation established by each bit of the binary data according to a Karnaugh map, and each bit of the V-ary data is expressed by a second logic equation using the first logic equation and the bits of the binary data, the block encoder includes a plurality of AND gates, a plurality of OR gates and a plurality of NOT gates to satisfy the second logic equation.

4. A block encoding method for OFDM transmission comprising:

generating V-ary data expressed in a group of n bits;

generating an OFDM symbol by modulating and inverse-fast-Fourier-transforming the V-ary data;

determining whether the OFDM symbol satisfies a predetermined condition, and if the OFDM symbol satisfies the predetermined condition, classifying the OFDM symbol as a candidate codeword;

extracting as many codewords as a number of receivable binary data from candidate codewords, in sequence of codewords having a small bit change; and forming a codebook by matching the extracted codewords to each receivable binary data.

5. The block encoding method for OFDM transmission of claim 4, wherein the condition for classifying the OFDM symbol into the candidate codeword is a determination as to whether a ratio of the peak power to the average power of the OFDM symbol is smaller than or equal to a predetermined value.

6. The block encoding method for OFDM transmission of claim 4, further comprising:

segmenting the codebook into predetermined areas;

expressing the segmented areas in first logic equations established by each bit of the binary data;

expressing each bit of the codeword in second logic equations established by the segmented areas and the bits of the binary data; and organizing a block encoder which satisfies the first and second logic equations, with a plurality of AND gates, a plurality of OR gates and a plurality of NOT gates, such that the codeword is output when the binary data is received.

7. A block encoding apparatus for OFDM transmission comprising:

V-ary data generator for generating V-ary data expressed in a group of n bits;

OFDM symbol generator for generating an OFDM symbol by modulating and inverse-fast-Fourier-transforming the V-ary data;

determiner for determining whether the OFDM symbol satisfies a predetermined condition, and if the OFDM symbol satisfies the predetermined condition, classifying the OFDM symbol as a candidate codeword;

code extractor for extracting as many codewords as a number of receivable binary data from candidate codewords, in sequence of codewords having a small bit change; and codebook storage unit for forming a codebook by matching the extracted codewords to each receivable binary data.

\* \* \* \* \*